July 29, 1958
C. P. CARAWAN
2,845,015
AGRICULTURAL MACHINE
Filed April 17, 1956
2 Sheets-Sheet 1
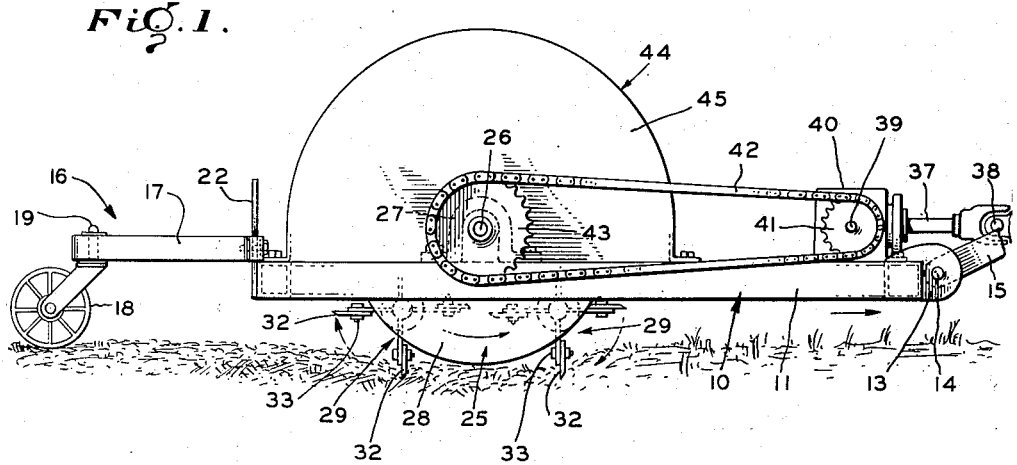
Fig. 1.
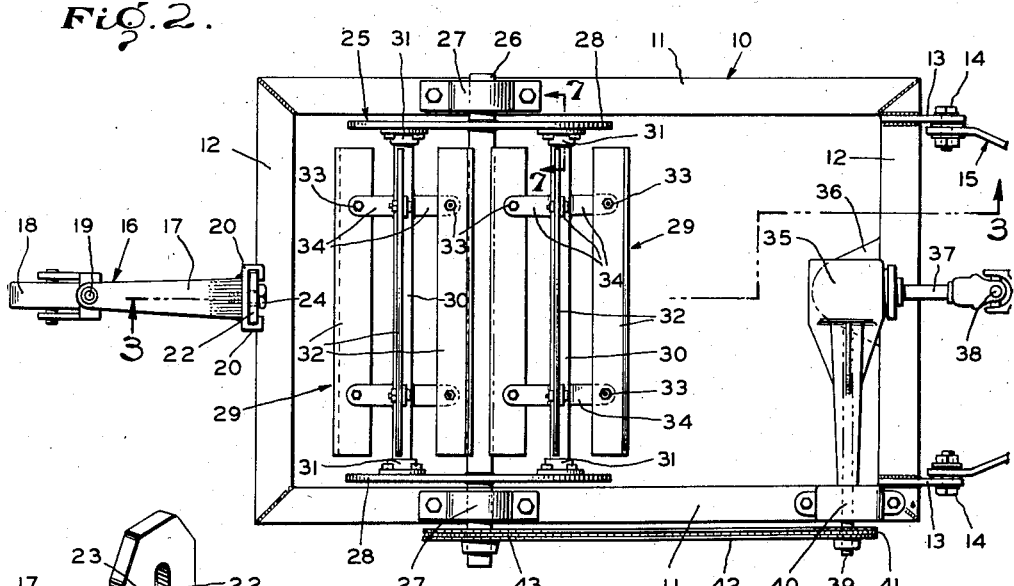
Fig. 2.
Fig. 4.
INVENTOR
*Clarence P. Carawan.*
BY *B. P. Fishburne, Jr.*
ATTORNEY July 29, 1958
C. P. CARAWAN
2,845,015
AGRICULTURAL MACHINE
Filed April 17, 1956
2 Sheets-Sheet 2
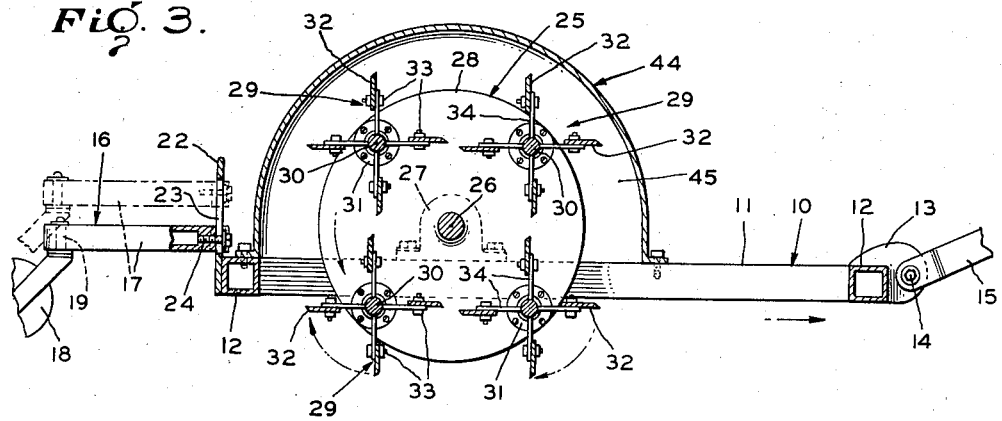
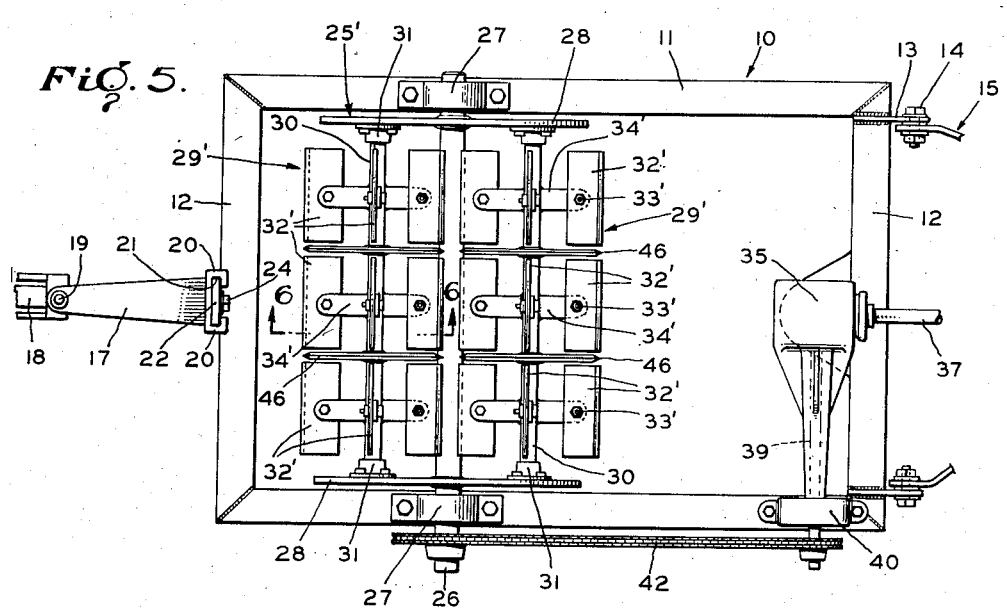
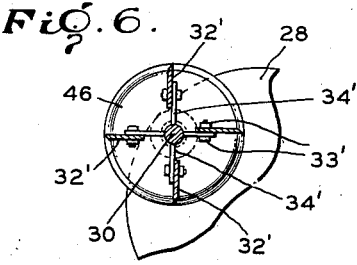
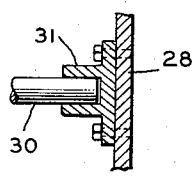
INVENTOR
Clarence P. Carawan.
BY
B. P. Fishburne, Jr.
ATTORNEY

United States Patent Office 2,845,015
Patented July 29, 1958

2,845,015

AGRICULTURAL MACHINE

Clarence P. Carawan, Camden, S. C., assignor of one-fourth to Austin Sheheen, one-fourth to George Sheheen, and one-fourth to L. C. Cable, all of Camden, S. C.

Application April 17, 1956, Serial No. 578,695

2 Claims. (Cl. 97—40)

This invention relates to an agricultural machine.

A primary object of the invention is to provide a machine which will cut or chop surface deposits of brush, grain or rice straw, and the like, and mix the small pieces with the soil in one continuous tilling operation.

A further object is to provide an agricultural machine of the above-mentioned character which will virtually grind or pulverize surface brush or matter, and simultaneously till the soil to a considerable depth, while mixing therein the pulverized surface matter.

A further object is to provide a machine of the above mentioned character which will also cut plant roots and weeds below the ground and mix them thoroughly with the soil, the use of the machine eliminating the need for separate mowing and plowing operations in many cases.

A still further object of the invention is to provide a machine of the above-mentioned character, embodying a novel and simplified arrangement of cutter units, which have a unique mode of operation for thoroughly and efficiently chopping or cutting the surface brush and mixing it with the soil as the machine travels forwardly behind a tractor or the like.

Another object is to provide a machine which is simplified and compact in construction, sturdy and durable, and relatively inexpensive to build.

Other objects and advantages of the invention will be apparent during the course of the following description.

In the accompanying drawings, forming a part of this application, and in which like numerals are employed to designate like parts throughout the same, Figure 1 is a side elevation of an agricultural machine embodying the invention, Figure 2 is a plan view of the machine with the hood or cover removed, Figure 3 is a longitudinal vertical section taken on line 3—3 of Figure 2, Figure 4 is an enlarged fragmentary perspective view of rear wheel adjusting means, Figure 5 is a plan view of a machine embodying a modification of the invention and with the cover removed, Figure 6 is a fragmentary vertical section taken on line 6—6 of Figure 5, and, Figure 7 is an enlarged fragmentary vertical section taken on line 7—7 of Figure 2, and showing details of construction common to both forms of the invention.

In the drawings, wherein for the purpose of illustration are shown preferred embodiments of the invention, attention is directed first to Figures 1 to 4 and 7, wherein the numeral 10 designates generally a main horizontal rectangular support frame or body portion, which is rigid and sturdy in construction. The frame 10 comprises parallel longitudinal frame sides or bars 11, and forward and rear transverse bars 12, rigidly secured by welding or the like to the bars 11. The rectangular frame 10 is substantially open as viewed in Figure 2.

The forward transverse bar 12 has a pair of apertured lugs 13 rigidly secured thereto near its opposite ends and adapted to be pivotally secured by bolts 14 or the like to the hitch or draw bar means 15 of a tractor or the like, whereby the forward end of the frame 10 is rigidly held against lateral or sidewise movement, but is shiftable vertically by means of its pivotal connection at 14 with the tractor draw bar means.

The rear transverse bar 12 has secured to it a single trailing caster 16 or wheel unit, comprising a relatively short horizontal arm or beam 17, arranged at the transverse center of the frame 10 and extending rearwardly of the bar 12, at right angles thereto. The boggy or caster 18 is pivoted at 19 to the rear end of the arm 17, as shown, and the forward end of the arm 17 has a pair of opposed substantially C-shaped elements or flanges 20, integrally secured thereto and forming opposed vertical grooves 21 for the reception of a vertical plate 22, which is rigidly secured by welding or the like to the outer side of the bar 12, at the longitudinal center of the latter. The vertical plate 22 extends above the transverse bar 12, as shown, and has a central longitudinal slot 23 formed therethrough for the reception of an adjusting or clamping screw 24, having screw-threaded engagement within a screw-threaded opening formed in the forward end of the arm 17. By this means, as clearly shown in Figure 4, the arm 17 and the caster 18 may be vertically adjusted with respect to the frame 10. Thus, the entire frame 10 may be rendered level or horizontal by adjusting the rear caster unit 16 upwardly or downwardly, depending upon the height or plane of the rear axle of the particular towing tractor, not shown.

A rotary cutting unit or drum 25 is arranged within the frame 10, near and forwardly of the rear bar 12 and the unit 25 comprises a transverse horizontal rotary axle or shaft 26, having its end portions arranged above the frame bars 11 and freely journaled within bearings 27, rigidly mounted upon the frame bars 11, as shown. The shaft 26 extends at right angles to the frame bars 11, and is spaced somewhat above the rectangular frame 10, as shown.

Near and inwardly of the longitudinal bars 11, the rotary shaft 26 has a pair of relatively large circular vertical plates 28 rigidly secured thereto by welding or the like. The plates 28 are preferably quite heavy and rigid and they form the support means for individual rotary cutter bar units to be described. The plates 28 extend above and below the horizontal frame 10, as shown in the drawings. The plates 28 are adapted to rotate with the shaft 26 in parallel vertical planes, at right angles to the shaft 26, and the plates 28 are preferably substantially free of springiness.

A plurality of separate rotary cutter bar units 29, preferably four in number, are mounted upon the rotary drum 25 in circumferentially equidistantly spaced relation, as shown. Each cutter bar unit 29 comprises a transverse horizontal rotary axle or shaft 30 having its ends freely journaled within bearings or sleeves 31, which are rigidly secured in axial alignment to the inner faces of the plates 28, near and inwardly of the peripheries thereof. The shafts 30 of the units 29 are equidistantly spaced circumferentially of the plates 28, as best shown in Figure 3, and the units 29 are disposed near the peripheries of the plates 28.

Each unit 29 further comprises a plurality of elongated transverse horizontal cutter bars or blades 32, rigidly secured at 33 to sets of radial spokes 34, having their inner ends rigidly secured to the shaft 30, as shown. The cutter bars 32 of each unit 29 are thus spaced equidistantly radially and circumferentially of the rotary shaft 30, and the cutter bars 32 of each unit 29 are preferably four in number, as shown, although the number of cutter bars may be varied if desired. The cutter bars 32 of each unit 29 preferably extend throughout substantially the entire distance between the plates 28, and the cutter bars are preferably of equal length. The cutter bars extend substantially radially of the shaft 30, as shown. The cutter bars 30 and the spokes 34 which carry them are preferably of sturdy and rigid construction, so that the cutter bars will be adapted not only to cut or chop surface brush, straw and the like, but also to till the soil to a considerable depth. Each cutter bar unit 29 is freely rotatable within its bearings 31, independently of the other cutter bar units 29. As shown in the drawings, the individual cutter bars 32 extend beyond the peripheries of the vertical plates 28 for considerable distances, whereby they may penetrate the soil beyond the peripheries of the plates 28.

Means are provided to drive or rotate the entire cutting unit or drum 25 counter-clockwise, Figures 1 and 3, as indicated by the arrows in these figures. Such means comprises a miter gear unit 35, rigidly mounted upon an extension 36 of the forward transverse bar 12, at the longitudinal center of the same. The longitudinal input shaft 37 of the gear unit 35 is connected as at 38 with the conventional power take-off shaft of the tractor, not shown. A transverse horizontal output shaft 39 of the gear unit 35 has its outer end journaled within a bearing 40, fixedly secured to the adjacent frame bar 11, near the forward end of the same. Near and outwardly of the bearing 40, the shaft 39 has a sprocket wheel 41 rigidly secured thereto for rotation therewith, and a longitudinally extending sprocket chain 42 engages the sprocket wheel 41, and also engages a rear sprocket wheel 43, rigidly secured to the adjacent outer end of shaft 26, outwardly of the bearing 27, Figure 2. The sprocket wheel 43 is preferably larger than the sprocket wheel 41, as shown, and the two sprocket wheels lie in the same vertical plane, as shown.

The entire rotary assembly or drum 25 preferably has its upper side enclosed within a semi-cylindrical hood or cover 44, as shown in Figures 1 and 3, and this hood is suitably rigidly secured to the top of the horizontal frame 10. The hood or cover 44 preferably includes vertical end walls 45, arranged outwardly of the plates or discs 28, as indicated. The hood or cover 44 is entirely open at its bottom. The hood prevents scattering or broadcasting of the soil and cut material by the cutter blades, and also constitutes a safety feature of the machine. However, the hood or cover may be omitted if desired, and the machine will function properly without it.

*Operation*

The machine is pulled forwardly by the tractor in the direction of the arrow, Figures 1 and 3, and the rear wheel unit 16 is previously adjusted so that the frame 10 will remain substantially horizontal.

The power take-off shaft from the tractor drives the shaft 37 and the gear unit 35, sprocket chain 42 and associated elements in a direction causing the assembly or drum 25 to turn counter-clockwise or in the direction of the arrows in Figures 1 and 3. The cutting drum 25 thus revolves and is power driven in a direction counter to the movement of the machine, but the bottom side of the drum 25 is moving forwardly and in the direction of movement of the entire machine when the individual cutter bar units 29 impinge upon the ground.

The individual cutter bar units 29, while being freely rotatable, are not power driven. As the drum 25 revolves, it imparts considerable momentum to the several units 29 so that when a particular cutter bar 32 strikes the ground, the inertia from the sheer weight of the drum 25 causes the cutter bar to shear or chop whatever surface material it touches and to simultaneously effect a spading or tilling of the soil beneath it. The individual cutter bar units 29 carried by the counter-rotating drum 25 will tend to rotate clockwise upon contact of their cutter bars 32 with the ground, as shown by the arrows in the drawings. The rotation of the drum 25, and the action of the units 29 and their sixteen cutter bars 32 assures an extremely closely spaced chopping or cutting of the soil and the brush or straw above it. Thus, the machine is capable of virtually grinding or pulverizing the surface deposits of brush or straw and then mixing them in the tilled soil to a considerable depth, and the machine will also cut sub-surface roots, weeds and the like, so as to perform simultaneously a brush cutting and soil tilling operation.

In Figures 5 and 6, there is shown a slight modification of the invention, wherein the overall construction and the mode of operation of the machine is substantially identical with that shown and described in connection with the prior form of the invention. However, in Figures 5 and 6, the individual cutter bar units 29' of the cutting drum or assembly 25' are constructed somewhat differently than the corresponding units 29 in the prior form of the invention. In the units 29', the cutter bars are formed in a plurality of sections 32', as shown, and a corresponding number of sets of spokes 34' support the cutter bar segments 32' in end-to-end relation, as shown. In the spaces between the adjacent cutter bar segments 32', circular disc knives 46 are arranged, and these disc knives are rigidly secured by welding or the like to the shaft 30, as shown. The peripheries of the disc knives 46 are preferably flush or even with the cutting edges of the cutter bar segments 32', as indicated. All other parts of the machine in Figures 5 and 6 are identical with the corresponding parts in the first form of the invention.

The operation of the machine shown by Figures 5 and 6 is identical with the operation of the machine embodying the first form of the invention, except that the disc knives 46 will effect a cutting or chopping of surface material and soil perpendicular, or at right angles to, the cutter bar segments 32'.

It is to be understood that the forms of the invention, herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. An agricultural machine for chopping surface brush and tilling the soil and spading in the chopped surface brush in one operation comprising, a substantially horizontal support frame, vertically adjustable wheel means engaging the upper surface of the soil and carrying the support frame and adapted to support the support frame at selected adjusted elevations, a pair of main bearings mounted upon the opposite sides of the support frame, a transverse horizontal main shaft journaled within the main bearings, a pair of substantially vertical relatively large substantially circular plates rigidly mounted upon the main shaft for rotation therewith and arranged inwardly of and adjacent to the sides of the support frame, the relatively large substantially circular plates being relatively thin at their peripheries and being free from elements connecting them at their peripheries and which would contact with the soil so that the substantially circular plates will readily sink into the soil during their rotation, transverse pairs of tubular bearings mounted upon the inner faces of the substantially circular plates and spaced inwardly from the peripheries of said plates, the transverse pairs of tubular bearings being substantially equidistantly spaced circumferentially of the circular plates, transverse horizontal cutter shafts extending between the circular plates and having their ends journaled in the pairs of tubular bearings, said cutter shafts being spaced radially inwardly from the peripheries of the substantially circular plates for substantial distances, circumferentially equidistantly spaced radial spokes secured to each cutter shaft and extending radially outwardly beyond the peripheries of the substantially circular plates during their rotation, substantially horizontal cutter blades arranged between the substantially circular plates and secured to the outer ends of said spokes and extending radially outwardly beyond the substantially circular plates during their rotation with respect to such plates, the horizontal cutter shafts and the tubular bearings being spaced radially inwardly from the cutter blades and the peripheries of the substantially circular plates, and speed reducing gearing connected with the main transverse shaft to positively rotate the same at a relatively low speed and turning the lower portions of the substantially circular plates in a forward direction with respect to the travel of the main frame.

2. An agricultural machine for chopping surface brush and tilling the soil and spading in the chopped surface brush in one operation comprising, a substantially horizontal support frame, vertically adjustable wheel means engaging the upper surface of the soil and carrying the support frame and adapted to support the support frame at selected adjusted elevations, a pair of main bearings mounted upon the opposite sides of the support frame, a transverse horizontal main shaft journaled within the main bearings, a pair of substantially vertical relatively large substantially circular plates rigidly mounted upon the main shaft for rotation therewith and arranged inwardly of and adjacent to the sides of the support frame, the relatively large substantially circular plates being relatively thin at their peripheries and being free from elements connecting them at their peripheries and which would contact with the soil so that the substantially circular plates will readily sink into the soil during their rotation, transverse pairs of tubular bearings mounted upon the inner faces of the substantially circular plates and spaced inwardly from the peripheries of said plates, the transverse pairs of tubular bearings being substantially equidistantly spaced circumferentially of the circular plates, transverse horizontal cutter shafts extending between the circular plates and having their ends journaled in the pairs of tubular bearings, said cutter shafts being spaced radially inwardly from the peripheries of the substantially circular plates for substantial distances, circumferentially equidistantly spaced radial spokes secured to each cutter shaft and extending radially outwardly beyond the peripheries of the substantially circular plates during their rotation, substantially horizontal cutter blades arranged between the substantially circular plates and secured to the outer ends of said spokes and extending radially outwardly beyond the substantially circular plates during their rotation with respect to such plates, said horizontal cutter blades including blade sections arranged in spaced end-to-end relation, circular cutters mounted upon each cutter shaft and extending into the spaces between the blade sections, the horizontal cutter shafts and the tubular bearings being spaced radially inwardly from the cutter blades and the peripheries of the substantially circular plates, and speed reducing gearing connected with the main transverse shaft to positively rotate the same at a relatively low speed.

References Cited in the file of this patent

UNITED STATES PATENTS

| | | |
|---|---|---|
| 502,301 | Kime | Aug. 1, 1893 |
| 1,084,810 | Messer | Jan. 20, 1914 |
| 1,523,922 | Wales | Jan. 20, 1925 |
| 1,784,410 | Alexander | Dec. 9, 1930 |
| 2,042,597 | Hargreaves | June 2, 1936 |